(12) United States Patent
Miyauchi et al.

(10) Patent No.: US 6,799,453 B2
(45) Date of Patent: Oct. 5, 2004

(54) MISFIRE DETECTION SYSTEM FOR VEHICLE MULTICYLINDER INTERNAL COMBUSTION ENGINE

(75) Inventors: Atsuhiro Miyauchi, Wako (JP); Kojiro Tsutsumi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/372,943

(22) Filed: Feb. 26, 2003

(65) Prior Publication Data

US 2003/0163242 A1 Aug. 28, 2003

(30) Foreign Application Priority Data

Feb. 28, 2002 (JP) ........................................ 2002-054267
Jun. 20, 2002 (JP) ........................................ 2002-179712

(51) Int. Cl.$^7$ ............................................ G01M 15/00
(52) U.S. Cl. ..................................................... 73/117.3
(58) Field of Search .............................. 73/116, 117.2, 73/117.3, 118.1; 340/438, 439, 441; 701/29, 101, 102, 110, 111

(56) References Cited

U.S. PATENT DOCUMENTS

| | | | | |
|---|---|---|---|---|
| 5,311,773 A | * | 5/1994 | Bradshaw et al. ............ 73/116 |
| 5,432,701 A | * | 7/1995 | Mayer et al. ................. 701/99 |
| 5,505,075 A | * | 4/1996 | Pfleger et al. ................ 73/105 |
| 5,507,180 A | * | 4/1996 | Tomisawa ................... 73/117.3 |
| 5,544,058 A | * | 8/1996 | Demizu et al. ............... 701/29 |
| 5,587,909 A | * | 12/1996 | Matsumoto et al. ........ 701/111 |

FOREIGN PATENT DOCUMENTS

JP  2976684  9/1999

* cited by examiner

*Primary Examiner*—Eric S. McCall
(74) *Attorney, Agent, or Firm*—Arent Fox, PLLC

(57) ABSTRACT

A system for detecting misfire occurred in an internal combustion engine installed in a vehicle, based on a rotation signal outputted by an engine speed sensor. In the system, first and second fluctuation value of the wheel rotation speed are calculated based on a signal, outputted by a wheel speed sensor, indicating a rotation speed of the vehicle wheel, and a parameter indicative of a degree of wheel rotation speed fluctuation is calculated by multiplying the calculated first and second fluctuation values. Then, the parameter is compared with a threshold value and when the number of times the parameter was equal to or greater than the threshold value has reached a predetermined value, it is discriminated that the vehicle is under a rough road running condition that affects the misfire detection and the misfire detection is disabled. With this, it becomes possible to reliably avoid false detection of misfire while ensuring that misfire detection is not erroneously disabled when misfire does occur.

34 Claims, 10 Drawing Sheets

MISFIRE DETECTION SYSTEM FOR VEHICLE MULTICYLINDER INTERNAL COMBUSTION ENGINE

BACKGROUND OF THE INVENTION

1. Field of the Invention

This invention relates to a misfire detection system for a vehicle multicylinder internal combustion engine, particularly to a system for detecting misfire occurred in an internal combustion engine having a plurality of cylinders.

2. Description of the Related Art

Misfiring of an internal combustion engine installed in a vehicle degrades the engine's performance and fuel efficiency and also adversely affects the exhaust gas purifier owing to after-firing of the unburned gas in the emission control system. Early detection of misfire is therefore desirable.

However, vehicles are driven under various conditions, and if misfire detection is conducted during vehicle running on a rough road with bumps and recesses, for example, false detection is apt to occur. This makes it necessary to accurately discriminate the rough road and other specific running (operating) conditions likely to cause erroneous misfire detection and to disable misfire detection when such a condition arises. Japanese Patent No. 2,976,684, for example, teaches a technology for this purpose which measures the period of a pulse signal output by a wheel speed sensor, calculates the average value for every prescribed number of pulse signals, calculates the difference between the preceding and current average values to determine the amount of fluctuation, compares the amount of fluctuation with a prescribed value to determine whether the vehicle is experiencing a rough road running condition or other such specific running (operating) condition that affects misfire detection, i.e., is likely to cause false misfire detection, and disables the misfire detection when such a running (operating) condition is found to be present.

However, this prior-art technology is limited to discrimination based on the amount of fluctuation in the measured value of the wheel speed sensor's output pulse signal period. It is therefore incapable of thoroughly distinguishing between wheel speed fluctuation caused by misfire and wheel speed fluctuation caused by a specific running (operating) conditions such as rough road running. The accuracy of the discrimination as to whether the vehicle is experiencing rough road running or other such specific running (operating) conditions is therefore often unsatisfactory.

SUMMARY OF THE INVENTION

An object of this invention is therefore to overcome the aforesaid problem by providing a misfire detection system for a vehicle multicylinder internal combustion engine that can reliably avoid false misfire detection by accurately discriminating rough road running and other specific running (operating) conditions that adversely affect misfire detection.

In a first aspect, the present invention achieves the foregoing object by providing a system for detecting misfire occurred in an internal combustion engine having a plurality of cylinders and installed in a vehicle, comprising: an engine speed sensor that outputs a signal at every prescribed crank angle indicative of a speed of the engine; misfire detection means for detecting misfire occurred in individual cylinders of the engine based on the rotation signal outputted by the engine speed sensor; a wheel speed sensor that outputs a signal indicating a rotation speed of a wheel of the vehicle; first fluctuation value calculation means for calculating a first fluctuation value of the wheel rotation speed based on the signal outputted by the wheel speed sensor through a first filter; second fluctuation value calculation means for calculating a second fluctuation value of the wheel rotation speed based on the signal outputted by the wheel speed sensor through a second filter; specific running condition discrimination means for calculating a parameter indicative of a degree of fluctuation of the wheel rotation speed based on the calculated first fluctuation value and second fluctuation value, and for discriminating whether the vehicle is under a specific running condition that affects the misfire detection of the misfire detection means based on the calculated parameter; and misfire detection disable means for disabling the misfire detection of the misfire detection means when the specific running condition discrimination means discriminates that the vehicle is under the specific running condition.

Thus, a rough road running condition or other such specific running (operating) condition affecting misfire detection can therefore be accurately detected to reliably avoid false detection of misfire while ensuring that misfire detection is not erroneously disabled when misfire does occur.

In a second aspect of the present invention, the first filter is a band-pass filter that passes a first prescribed frequency component in the output signal of the wheel speed sensor, and the second filter is a band-pass filter that passes a second frequency component that is higher than the first prescribed frequency and that is not a multiple of the first prescribed frequency.

By this, the eigenfrequency of the vehicle drive train can, for example, be selected as the prescribed frequency component to be extracted by the first filter, and a frequency component at which the effect of misfire does not easily appear in the output signal of the wheel speed sensor can, for example, be selected as the frequency that is higher than the prescribed frequency and not a multiple thereof to be extracted by the second filter. Solely the fluctuation of the wheel speed sensor output signal attributable to the rough road can therefore be extracted, i.e., fluctuation of the wheel speed sensor's output signal attributable to misfire can be eliminated.

In other words, since selection of a frequency that is not a multiple (in integer) of the prescribed frequency ensures that the effect of misfire does not appear simultaneously in both the output of the first filter and the output of the second filter, fluctuation of the wheel speed sensor output signal attributable to misfire can be eliminated and solely the wheel speed sensor output signal attributable to rough road running can be extracted. As a consequence, rough road running or other such specific running (operating) condition can be accurately detected to reliably avoid false discrimination of misfire while ensuring that misfire detection is not erroneously disabled when misfire does occur.

In a third aspect of the present invention, the first filter is a band-pass filter that passes a first prescribed frequency component in the output signal of the wheel speed sensor, and the second filter is a band-pass filter that passes a second frequency component that is higher than the first prescribed frequency and that is a multiple of the first prescribed frequency (that is an nth harmonic thereof).

In the third aspect, the second filter is used to select a frequency component whose frequency is higher than the prescribed frequency and, differently from in the second aspect, is a multiple of the prescribed frequency. Therefore, when misfire happens to occur at a frequency equal to the eigenfrequency of the vehicle drive system, a harmonic component that is a multiple thereof is selected by the second filter, and whether the fluctuation of the wheel speed sensor output signal is attributable to misfire or attributable to rough road running or other such specific running (operating) condition can be discriminated with good accuracy utilizing the output of the first and second fluctuation value calculation means obtained using the first and second filters by, for example, dividing the output of the first filter by the output of the second filter. As a consequence, false misfire detection can be reliably avoided without disabling misfire detection owing to erroneous detection of misfire as rough road running or the like.

In the foregoing, the term "misfire" is used to encompass all cases in which combustion does not occur, irrespective of whether because of failure of the fuel supply system or failure of the ignition system, and also irrespective of whether or not spark discharge occurs.

BRIEF DESCRIPTION OF THE DRAWINGS

The above and other objects and advantages of the invention will be more apparent from the following description and drawings, in which:

FIGS. 10A and 10B are a set of graphs in which FIG. 10A is a graph showing fluctuation of the vehicle speed during rough road running, whilst FIG. 10B is a graph showing a comparison of the parameter with the threshold value.

DETAILED DESCRIPTION OF THE PREFERRED EMBODIMENTS

Embodiments of the invention will now be explained with reference to the attached drawings.

Figure 1:
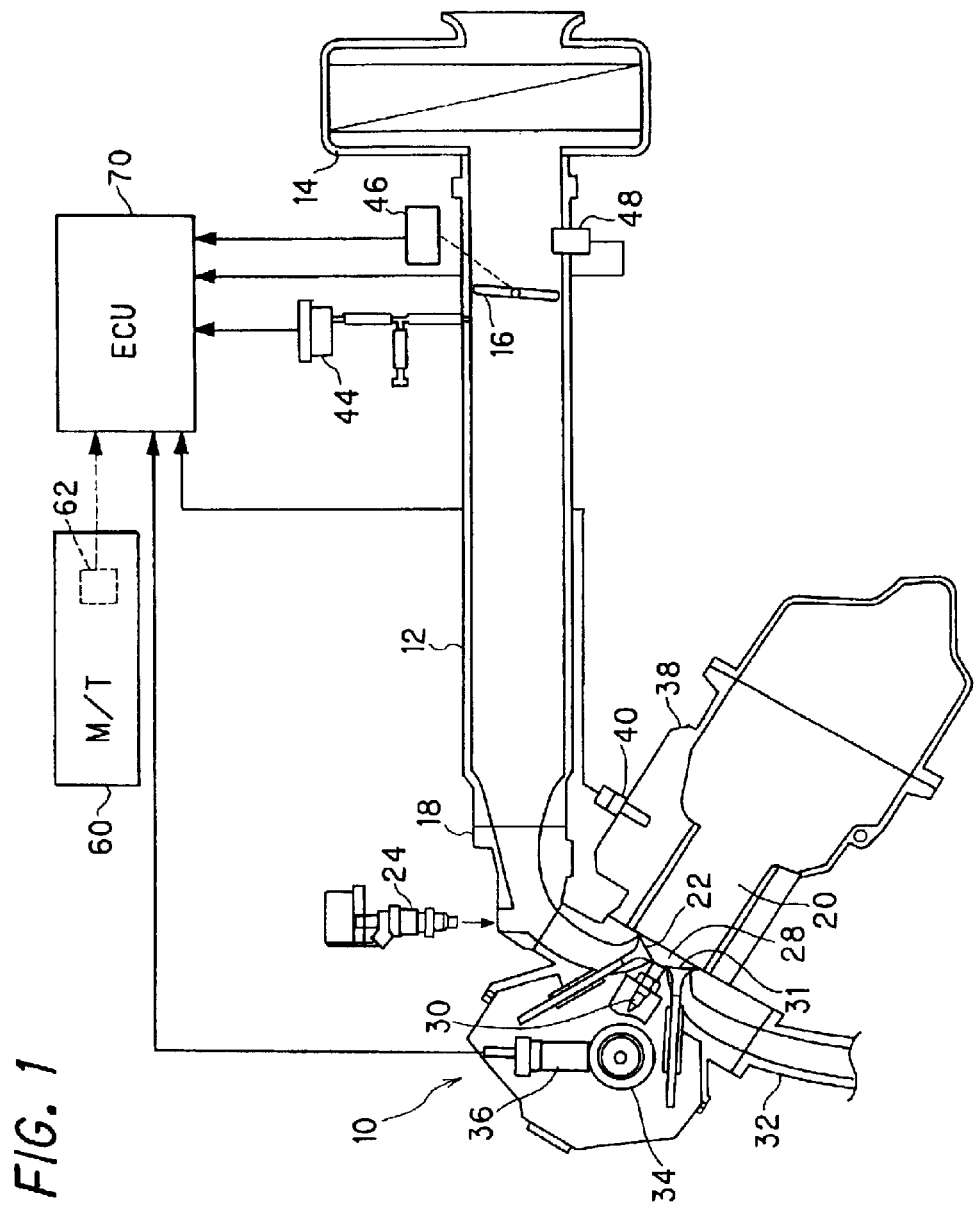
FIG. 1 is an overall schematic view showing a misfire detection system for a vehicle multicylinder internal combustion engine according to an embodiment of the present invention.

FIG. 1 is an overall schematic view showing a misfire detection system for a vehicle multicylinder internal combustion engine according to an embodiment of this invention.

Reference numeral 10 in the drawing designates an internal combustion engine (herein after called simply an "engine"). The engine 10 is a V6 (multicylinder) OHC engine. In the interest of simplicity, the drawing shows only one cylinder among six cylinders arranged in left and right banks (not shown) of three cylinder each.

In the engine 10, air drawn into an air intake pipe 12 through an air cleaner 14 mounted on its far end passes through an intake manifold 18 to intake valves 22 of cylinders 20, while the flow thereof is adjusted by a throttle valve 16.

Fuel injectors (fuel injection valves) 24 are installed upstream of the intake valves 22 for injecting pressurized fuel from a fuel supply system. The injected fuel mixes with the intake air to form an air-fuel mixture that passes into combustion chambers 28 of the cylinders 20 when the associated intake valves 22 are open to be ignited in the order of the first, fourth, second, fifth, third and sixth cylinder by a spark discharge produced by spark plugs 30 installed to face into the combustion chambers 28. Pistons (not shown) are driven when the air fuel mixture burns explosively.

At each cylinder, the exhaust gas produced by the combustion passes through an exhaust valve 31, an exhaust manifold 32 and an exhaust pipe (not shown) to a catalytic converter (not shown) to be purified and discharged into the atmosphere.

The engine 10 is equipped with a camshaft 34 near which is installed a camshaft sensor (engine speed sensor) 36 composed of multiple magnetic pickups. The camshaft sensor 36 outputs in the form of pulses a cylinder identification signal at a prescribed crank angle of the first cylinder, top dead center (TDC) signals at prescribed crank angles in the vicinity of the TDCs of the six cylinders, and a crank angle signal once every 30-degree subdivision (prescribed rotation angle) between the TDC signals. A coolant temperature sensor 40 installed in a coolant passage of a cylinder block 38 outputs a signal representing the engine coolant temperature TW.

A manifold absolute pressure sensor 44 provided in the air intake pipe 12 downstream of the throttle valve 16 outputs a signal proportional to the manifold absolute pressure PBA in the intake pipe downstream of the throttle valve (indicative of engine load). A throttle position sensor 46 associated with the throttle valve 16 outputs a signal proportional to the throttle opening TH. An intake air temperature sensor 48 installed at an appropriate part of the air intake pipe 12 outputs a signal corresponding to the temperature TA of the external air sucked into the engine 10.

The vehicle (not shown) equipped with the engine 10 has a manual transmission (designated M/T in the drawing) 60 with six forward speeds and one reverse speed for changing the gear ratio and transmitting the output of the engine 10 to the driven wheels (not shown). A wheel speed sensor 62 comprising a magnetic pickup is installed near a drive shaft (not shown) for outputting a signal indicating the rotation speed TNCD of the drive wheels once every prescribed rotation angle of the drive shaft (prescribed rotation angle of the wheels) rotated by the engine 10).

An air-fuel ratio sensor (not shown) installed in the exhaust system downstream of the catalytic converter outputs a signal corresponding to the oxygen concentration of the exhaust gas.

The outputs of the foregoing sensors are sent to an ECU (electronic control unit) 70.

The ECU 70 is constituted as a microcomputer equipped with a CPU, ROM and RAM (all not shown). The output pulses of the camshaft sensor 36 and the wheel speed sensor 62 are counted in the ECU 70 and used to calculate engine speed NE and vehicle speed V.

The CPU of the ECU 70 uses the detected engine speed NE and manifold absolute pressure PBA (indicative of engine load) as address data for retrieving a basic fuel injection quantity (represented as injector 24 open time) and a basic ignition timing from maps (mapped data) prepared and stored in the ROM beforehand and calculates an output fuel injection quantity and an output ignition timing by using the engine coolant temperature TW etc. to correct the calculated basic values.

The CPU then operates through an output circuit and a drive circuit (neither shown) to open the injectors 24 in the foregoing cylinder order each for a time corresponding to the calculated output fuel injection quantity. It also operates through an igniter (not shown) to cause each spark plug 30 to spark discharge at a crank angle corresponding to the output ignition timing, thereby igniting and burning the air-fuel mixture.

In addition, as explained further later, the CPU conducts misfire detection and, based on the discrimination result, discriminates whether or not the engine 10 is operating abnormally.

The misfire detection and abnormality discrimination, i.e., the operation of the misfire detection system for a vehicle multicylinder internal combustion engine according to this embodiment, will now be explained with reference to the flow chart of FIG. 2.

Figure 2:
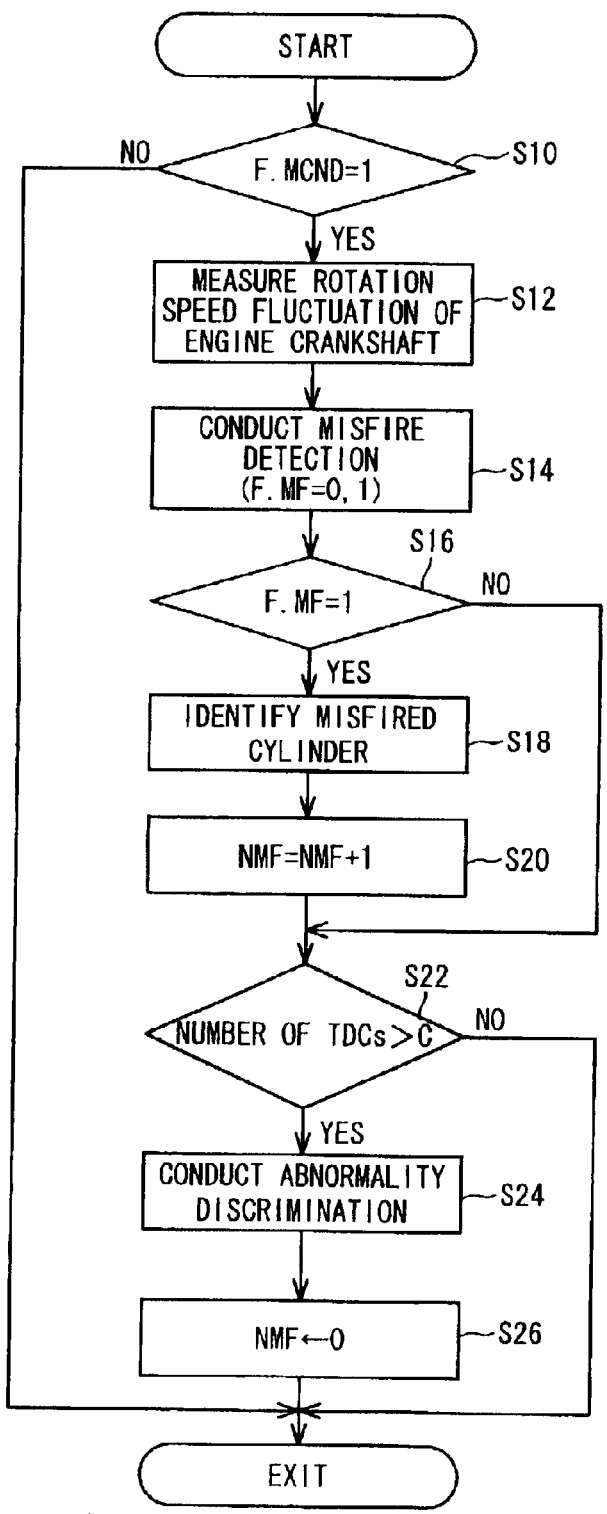
FIG. 2 is a main flow chart showing the operations of the system illustrated in FIG. 1.

FIG. 2 is the main flow chart showing the overall sequence of the operations of the system. The illustrated program is executed at or near every cylinder TDC (top dead center of the piston).

First, in S10, it is determined whether the bit of a flag F.MCND is set to 1. The flag F.MCND is set to 1 when a routine (explained below) for discriminating whether or not conditions permitting misfire detection (monitoring conditions) are met finds that the monitoring conditions are met. The determination in S10 therefore amounts to determining whether the monitoring conditions are satisfied.

For ease of understanding, the routine for discriminating whether the monitoring conditions are met will be explained first, before continuing with the explanation of the flow chart of FIG. 2.

Figure 3:
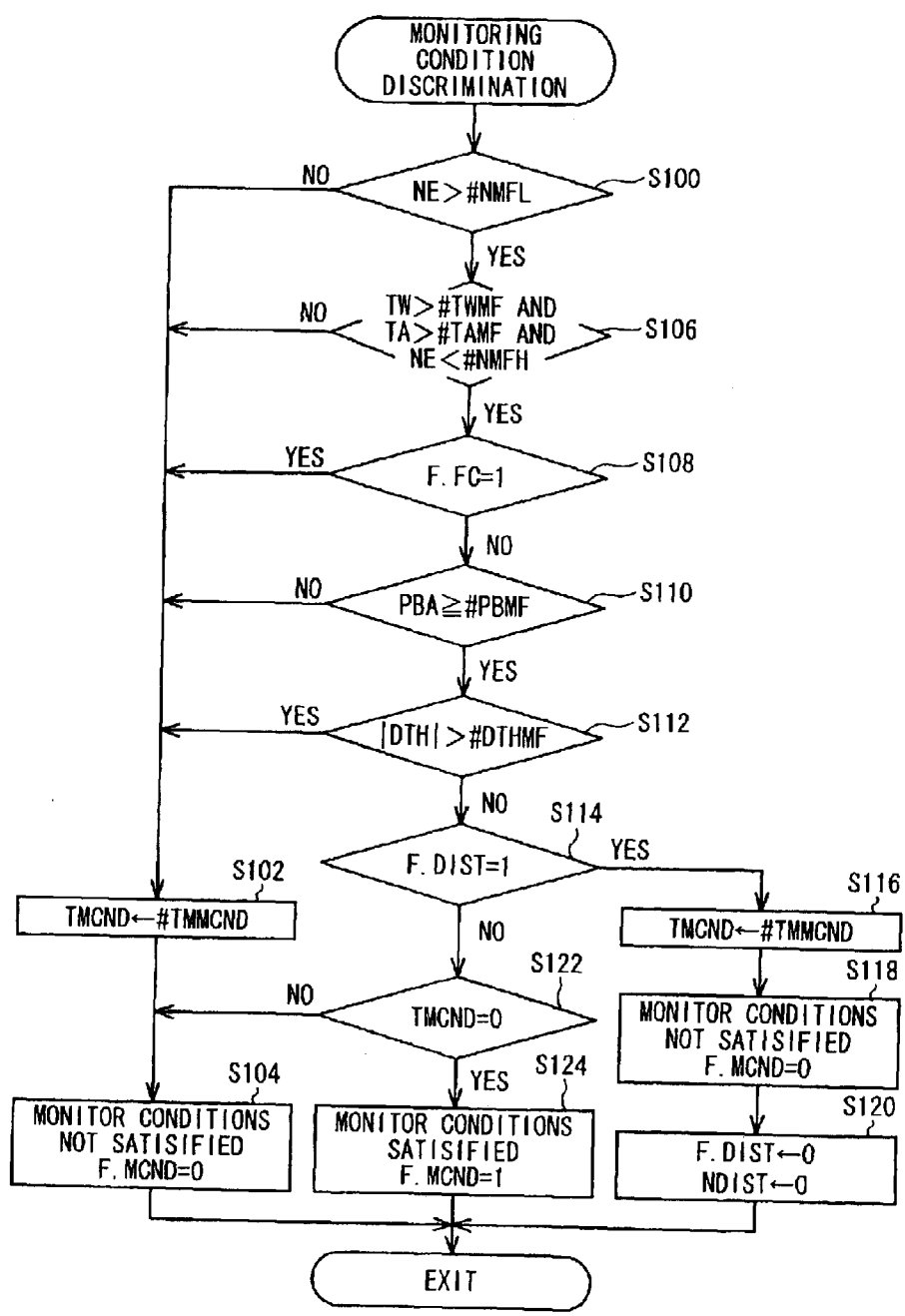
FIG. 3 is a flow chart showing a routine for discriminating whether monitoring conditions are met which are referred to in the flow chart of FIG. 2.

FIG. 3 is a flow chart showing the sequence of operations of this routine. The illustrated routine is executed at every cylinder TDC.

First, in S100, it is determined whether the detected engine speed NE exceeds a prescribed engine speed #NMFL (corresponding to idling speed; e.g., 500 rpm). (In this specification and the drawings, the prefix # is used to denote that the value concerned is set in advance.)

When the result in S100 is NO, the program proceeds to S102, in which a timer (down-counter; explained later) TMCND is set to a prescribed value #TMMCND (e.g., 1 sec) and down-counting (elapsed time measurement) is started, and then to S104, in which the bit of the flag F.MCND is reset to 0. The other steps of the routine are skipped. The bit of this flag F.MCND being reset to 0 means it is found that the monitoring conditions are not satisfied.

On the other hand, when the result in S100 is YES, the program proceeds to S106, in which it is determined whether the detected engine coolant temperature TW exceeds a prescribed value #TWMF (e.g., −10° C.), the intake air temperature TA exceeds a prescribed value #TAMF (e.g., −10° C.), and the engine speed NE is less than a prescribed value #NMFH (e.g., 6,300 rpm).

The processing in S100 and S106 are for determining whether the operating state of the engine 10 is one in which misfire detection should be conducted. Therefore, similarly to when the result in S100 is NO, the program also proceeds to S102 when the result in S106 is NO. When the result in S106 is YES, the program proceeds to S108, in which it is determined whether the bit of a flag F.FC is set to 1.

The bit of the flag F.FC is set to 1 when it is found in a separate routine not shown in the drawings that FC (fuel cut; i.e., cutoff of the fuel supply) is in effect. The processing of S108 therefore amounts to determining whether the supply of fuel (gasoline) to the engine 10 is cut off.

When the result in S108 is YES, the program proceeds to S102. When it is NO, the program proceeds to S110, in which it is determined whether the detected manifold absolute pressure PBA is equal to or greater than a prescribed value #PBMF. The prescribed value #PBMF can be freely retrieved using the engine speed NE as address data. The determination made in S110 is carried out because misfire detection need be conducted only when the engine 10 is at work. In other words, it is made to determine whether the engine load exceeds the driving load, i.e., to confirm that the engine 10 is not in a motoring state of being driven from the vehicle wheels.

A NO result in S110 means that the engine 10 is in a motoring state not requiring misfire detection, so the program proceeds to S102. When the result in S110 is YES, i.e., when it is found that the engine 10 is in a firing state, the program proceeds to S112, in which the difference DTH between the throttle opening TH detected in the current cycle and the throttle opening TH detected in preceding cycle (the last time the program was executed) is calculated and determined as to whether its absolute value exceeds a prescribed value #DTHMF (e.g., 5 degrees).

This determination is made to determine whether the engine 10 is in a rapidly accelerating or decelerating state because false misfire detection is apt to occur in such a state. Therefore, when the result in S112 is YES, the program proceeds to S102 on the assumption that the operating condition is not normal or in a steady-state. When the result is NO, the program proceeds to S114, in which it is determined whether the bit of a flag F.DIST is set to 1.

The bit of this flag is set to 1 when it is determined in a separate routine that a rough road running or other such specific running (operating) condition prevails. The particulars of this separate routine will be explained later. When the result in S114 is YES, the program proceeds to S116, in which the timer TMCND is set to a prescribed value

TMMCND and down-counting (elapsed time measurement) is started. The program then proceeds to S118, in which the bit of the flag F.MCND is reset to 0 because, as pointed out earlier, misfire is likely to be falsely detected when a rough road running or other such specific running (operating) condition persists, whereafter the program proceeds to S120, in which the bit of the flag F.DIST is reset to 0 and the value of NDIST (a counter explained later) is reset to 0.

On the other hand, when the result in S114 is NO, the program proceeds to S122, in which it is determined whether the value of the timer TMCND has reached 0, specifically, whether 1 second has passed since the circumstances preventing establishment of the monitoring conditions ceased to exist. In other words, it is determined whether the operating condition of the engine 10 has stabilized to the point of enabling misfire detection.

When the result in S122 is NO, therefore, the program proceeds to S104, and when it is YES, the program proceeds to S124, in which the bit of the flag F.MCND is set to 1. The bit of this flag being set to 1 means that the monitoring conditions, i.e., the conditions allowing misfire detection, are satisfied.

The process for discriminating whether or not a rough road running or other such specific running (operating) condition is present will now be explained.

Figure 4:
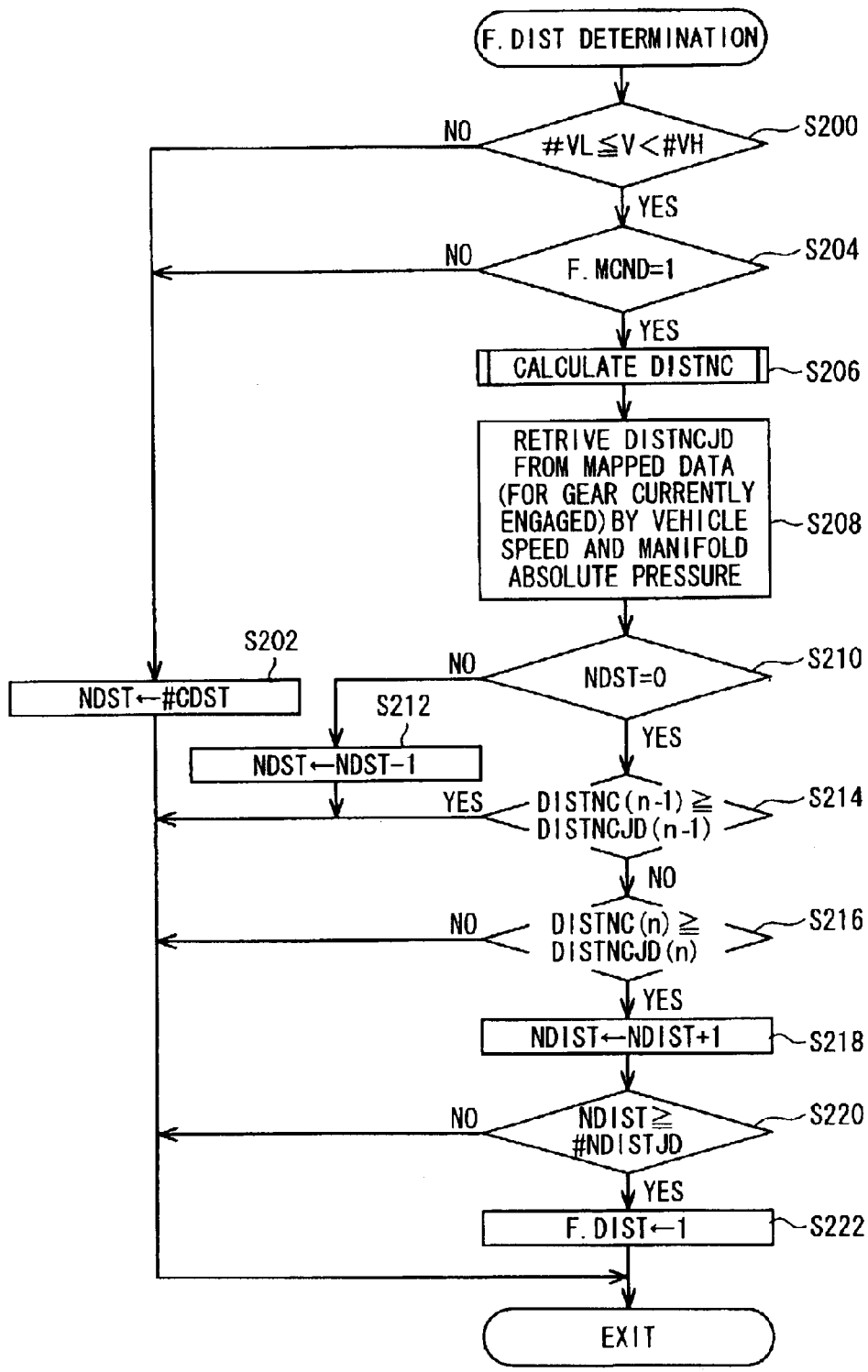
FIG. 4 is a flow chart showing a routine for discriminating whether a rough road running or other such specific running (operating) condition is present referred to in the flow chart of FIG. 3.

The steps of the discrimination process are shown by the flow chart of FIG. 4. This program is executed at or near the TDC of each cylinder (more specifically, at ATDC 10 degrees).

First, in S200, it is determined whether the detected vehicle speed V is equal to or greater than a prescribed value #VL (e.g., 20 km/h) and less than a prescribed value #VH (e.g., 120 km/h). This is because it suffices to conduct rough road discrimination when the vehicle speed is in this range.

Therefore, when the result in S200 is NO, i.e., when rough road discrimination is not required, the program proceeds to S202, in which a timer (down-counter) NDST is set to a prescribed value #CDST (1 sec) and down-counting (elapsed time measurement) is started. The other steps of the program are skipped.

On the other hand, when the result in S200 is YES, the program proceeds to S204, in which it is determined whether the bit of the flag F.MCND is set to 1. When the result in S204 is NO, the monitoring conditions are not met and rough road discrimination is again unnecessary. The program therefore proceeds to S202. When the result in YES, the program proceeds to S206, in which a value DISTNC is calculated.

Figure 5:
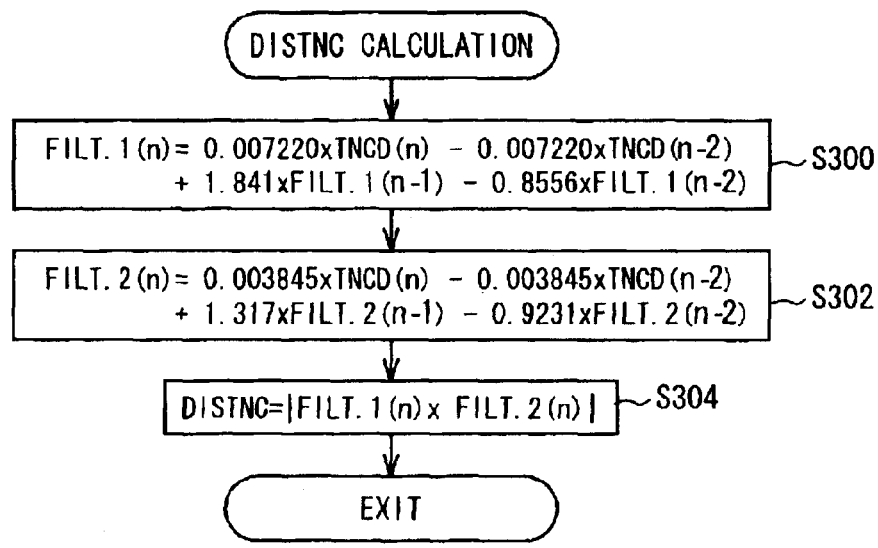
FIG. 5 is a flow chart showing a subroutine of calculation of a value DISTNC referred to in the flow chart of FIG. 4.

FIG. 5 is a subroutine flow chart showing this calculation.

First, in S300, the output of filter FILT.1(n) defined by the equation shown in the drawing is calculated. This is done by using a first filter FILT.1 to calculate a first fluctuation value of the wheel rotation speed TNCD (i.e., the output of the first filter FILT.1) based on the output signal of the wheel speed sensor 62. More specifically, in this case the wheel rotation speed TNCD is expressed as a time value.

In this specification and the drawings, the symbols (n) and (n-m) are used to denote discrete system sample numbers. More specifically, in the flow charts of FIGS. 4, 5 etc., they denote program execution time points. Specifically, (n) denotes the time point of the current program cycle and (n-m) denotes the time of mth earlier program cycle.

Next, in S302, the output of filter FILT.2(n) defined by the equation shown in the drawing is calculated. This is done by using a second filter FILT.2 to calculate a second fluctuation value of the wheel rotation speed TNCD (i.e., the output of the first filter FILT.2) based on the output signal of the wheel speed sensor 62.

Next, in S304, the calculated first filter FILT.1 and 2 outputs are multiplied to obtain the value DISTNC. The value DISTNC is a parameter (rough road discrimination parameter) indicating the degree of rotation speed fluctuation of the wheels (drive wheels). The processing of FIG. 5 will be explained further later.

Returning to the explanation of the flow chart of FIG. 4, next, in S208, the currently engaged gear of the manual transmission 60 (speed or gear ratio) is detected by an appropriate method, and a value DISTNCJD for the currently engaged gear is retrieved from a map (mapped data) using the vehicle speed V and the manifold absolute pressure (indicative of the engine load) PBA as address data. The value DISTNCJD is a threshold value against which the rough road discrimination parameter DISTNC is compared for determining whether the vehicle is experiencing the specific running (operating) condition of running or driving on a rough road. This will also be explained in more detail later.

Figure 6:
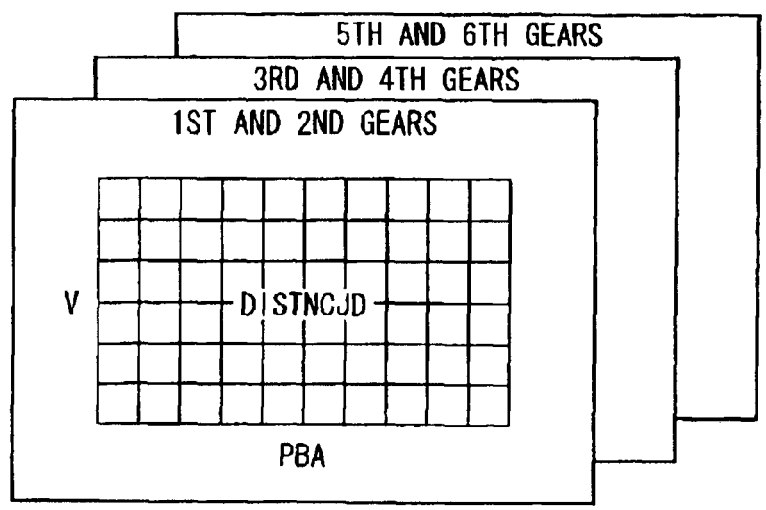
FIG. 6 is a diagram for explaining the characteristics of a map (mapped data) of a threshold value DISTNCJD referred to in the flow chart of FIG. 4.

FIG. 6 is a diagram for explaining the characteristics of the maps (mapped data) from which the value DISTNCJD is retrieved. Since the manual transmission 60 in this embodiment has six forward speeds, maps are prepared in advance for the first and second speeds, the third and fourth speeds, and the fifth and sixth speeds. Therefore, if the manual transmission 60 is detected to be in third gear, for example, the third and fourth speed map is selected and the threshold value DISTNCJD is retrieved using the vehicle speed V and the manifold absolute pressure PBA as address data.

Next, in S210, it is determined whether the value of the timer NDST has reached 0. Similarly to what was explained earlier regarding the timer TMCND, this is for determining whether 1 second has passed since the circumstances not allowing rough road discrimination ceased to exist. Specifically, it is for determining whether the operating condition of the engine 10 has stabilized to the point of enabling rough road discrimination.

When the result in S210 is NO, the program proceeds to S212, in which the timer value is decremented by 1. When it is YES, the program proceeds to S214, in which it is determined whether the rough road discrimination parameter DISTNC(n-1) calculated in the preceding cycle is equal to or greater than the threshold value DISTNCJD(n-1) calculated in the preceding cycle.

The explanation of the flow chart of FIG. 4 will be interrupted at this point in order to explain the rough road discrimination parameter DISTNC, the threshold value DISTNCJD etc.

When the vehicle travels on a rough road or other irregular road surface with bumps and recesses, the wheels may separate from the road surface at one moment and hit forcefully against it the next. This produces abrupt variations in the engine rotation that might be misdiagnosed as misfire. Whether or not the vehicle is experiencing rough road running or other such specific running (operating) condition must therefore be accurately discriminated. The prior art discussed earlier is unsatisfactory on this point because it discriminates presence/absence of rough road running from periodic fluctuation of the output pulse signal of a wheel speed sensor.

Through continued studies, the inventors learned that rough road running and other such specific running (operating) conditions can be accurately discriminated by determining a rough road discrimination parameter based on the eigenfrequency (natural vibration) of the vehicle drive train. The eigenfrequency of the drive train from the rotating parts of the engine 10 through the manual transmission 60 and axle and to the wheels is uniquely determined by their physical structure. In the vehicle to which this embodiment was applied, the eigenfrequency was 2 Hz.

Figure 7:
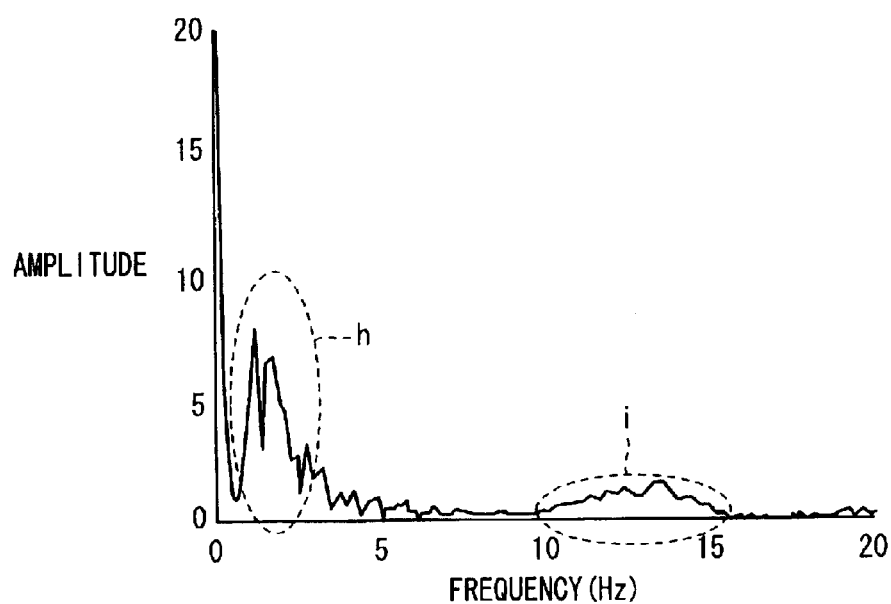
FIG. 7 is a view showing measured data indicating the free vibration response of the drive train, more specifically the wheels, caused by vibration produced when the vehicle was running on a rough road (with no misfiring occurred)
Figure 8:
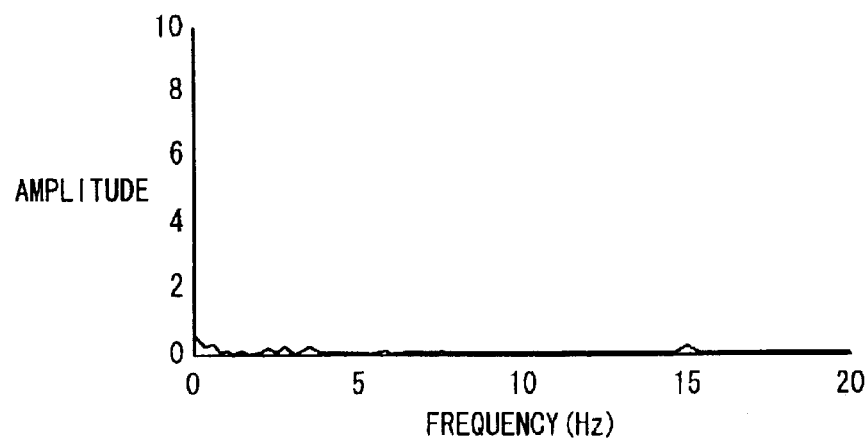
FIG. 8 is a view, similar to FIG. 7, but showing measured data when the vehicle was running on a smooth road (with no misfiring occurred)
Figure 9:
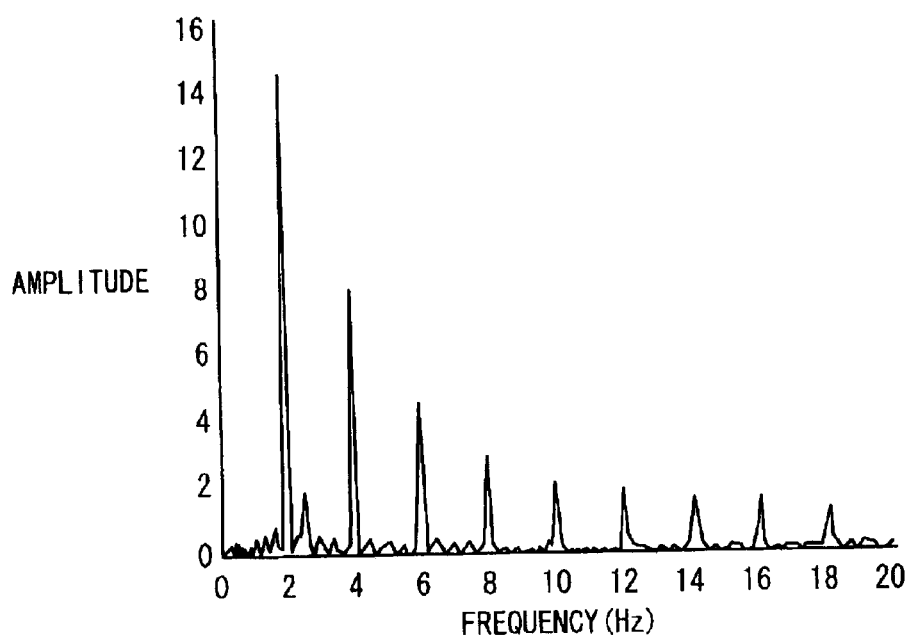
FIG. 9 is a view, similar to FIG. 7, but showing measured data with misfiring occurred during running on a smooth road.

FIG. 7 shows a plot of measured data indicating the free oscillation response of the drive train, more specifically the wheels, caused by vibration produced when the vehicle was running on a rough road (with no misfiring occurred). FIG. 8 is a plot of corresponding measured data when the vehicle was running on a smooth road (with no misfiring occurred). FIG. 9 is a plot of corresponding measured data with misfiring occurred during running on a smooth road.

As shown in FIG. 7, it was found by focusing attention on the vehicle speed fluctuation frequency characteristic obtained by Fourier transformation that the amplitude of the vibration during rough road running became large in the vicinity of the eigenfrequency 2 Hz, i.e., the region designated by the symbol h in the drawing, and diminished progressively with increasing frequency except for the region of 10 Hz to 15 Hz indicated by the symbol i where the amplitude of the vibration was relatively large. On the other hand, as shown in FIG. 8, no such amplitude fluctuation was observed during smooth road running.

As shown in FIG. 9, when misfire occurred, large amplitude spikes were observed at 2 Hz, corresponding to the eigenfrequency, and at 4 Hz, 6 Hz and other multiples (in integer) thereof, but no such spike was observed at frequencies (frequency components) that were not multiples (in integer) the eigenfrequency (i.e., at frequencies (such as 13 Hz) that were not nth harmonics of the eigenfrequency).

Thus, when the vehicle was running on a rough road, the vehicle speed fluctuation was great in the vicinity of the vehicle drive train eigenfrequency (the prescribed frequency) of 2 Hz but notwithstanding that the vehicle speed fluctuation was large at 10 Hz to 15 Hz and other frequencies greater than but not multiples (in integer) eignenfrequency, such as 13 Hz, no fluctuation appeared at 13 Hz even when misfire occurred at a period of 2 Hz. This means that the effects of a rough road running and misfire can be distinguished.

Based on this knowledge, the inventors adopts an arrangement that extracts (calculates) a component corresponding to the 2 Hz of the wheel speed sensor 62 by calculating the output of a filter FILT.1 defined as shown in S300 of FIG. 5 and extracts (calculates) a component corresponding to the 13 Hz of the wheel speed sensor 62 by calculating the output of a filter FILT.2 defined as shown in S302. By this it become possible to replace Fourier transformation, which requires a large amount of computation, with calculation using a digital filter capable of real-time processing.

The filter FILT.1 (first filter) is a band-pass filter that passes a prescribed frequency (eigenfrequency) in the output signal of the wheel speed sensor 62, and the second filter FILT.2 (second filter) is a band-pass filter that passes a frequency in the output signal that is higher than the prescribed frequency and not a multiple (in integer) of the prescribed frequency.

The frequency that is higher than the prescribed frequency and not a multiple (in integer) of the prescribed frequency is defined as, for example, 13 Hz because the prescribed frequency is affected by the eigenfrequency when only slightly higher than it and the frequency itself attenuates excessively when much higher than the prescribed frequency. A frequency in the range of 11 Hz to 13 Hz, for example 13 Hz, is therefore selected in light of these two factors.

The product obtained by multiplying the calculated outputs of the first filter FILT.1 and second filter FILT.2 is defined as the rough road discrimination parameter DISTNC, while the threshold value DISTNCJD to be compared therewith is determined experimentally and retrieved from a map (mapped data) associated with the current gear using the vehicle speed V and the manifold absolute pressure PBA as address data.

Figure 10A:
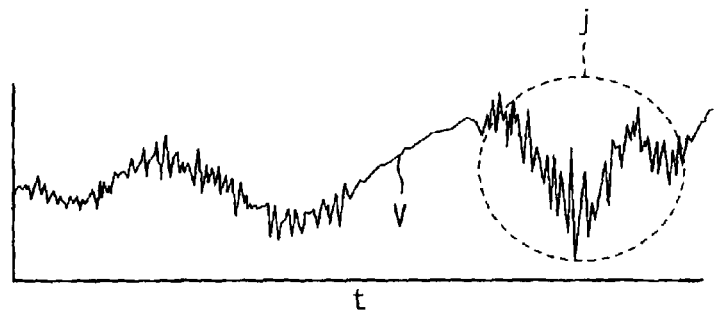
Figure 10B:
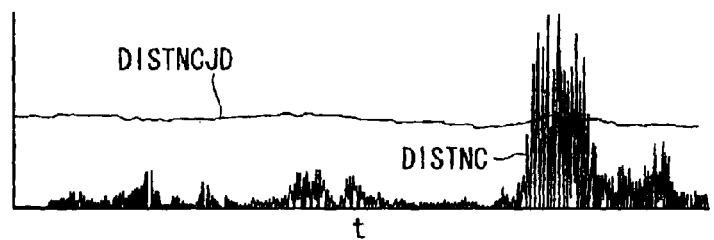

Therefore, while, as indicated at j in FIG. 10A, the vehicle speed V varies during rough road running irrespective of the presence/absence of misfire and could become a cause for false misfire detection, it is prevented from doing so because rough road running is discriminated with good accuracy by, as shown in FIG. 10B, comparing the rough road discrimination parameter DISTNC with the threshold value DISTNCJD and, as explained further below, determining that the vehicle is traveling on a rough road when the number of times the parameter exceeds the threshold value counted by the counter NDIST reaches a prescribed value. In other words, false misfire detection is avoided by discriminating when the monitoring conditions are not met.

The product of the outputs of the first filter FILT.1 and second filter FILT.2 is defined as the parameter because the 2 Hz and 13 Hz components both reach or exceed a certain level during rough road running. Another reason for so defining the parameter is that when one of the two becomes zero (or nearly zero), so that their product becomes zero (or nearly zero) and thus smaller than the threshold value DISTNCJD, the variation in rotation speed caused by misfire can be eliminated to extract only the variation in rotation speed caused by road surface roughness.

The threshold value DISTNCJD is made retrievable by using the vehicle speed V and manifold absolute pressure PBA as address values because by using these the value of the rough road discrimination parameter DISTNC comes to be determined primarily by the vibration characteristics of the vehicle drive train and the engine driving torque. The threshold value DISTNCJD is varied with gear ratio because the vibration characteristics of the vehicle drive train change with gear ratio and this changes the value of the discrimination parameter DISTNC.

Returning to the explanation of the flow chart of FIG. 4, when it is found in S214 that the rough road discrimination parameter DISTNC(n−1) calculated in the preceding cycle is equal to or greater than the threshold value DISTNCJD(n−1) calculated in the preceding cycle, i.e., when the result in S214 is YES, the remaining steps of the routine are skipped. When the result in S214 is NO, the program proceeds to S216, in which it is similarly determined whether the rough road discrimination parameter DISTNC(n) calculated in the current cycle is equal to or greater than the threshold value DISTNCJD(n) calculated in the current cycle.

Figure 10C:
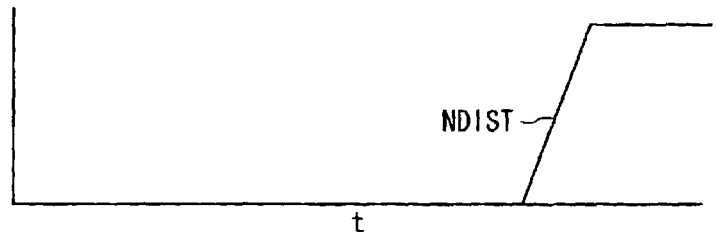
FIG. 10C is a graph showing counting the number of times the parameter exceeds the threshold value.

When the result in S216 is NO, the remaining steps are skipped. When it is YES, the program proceeds to S218, in which the value of the counter NDIST is incremented by 1. This is shown in FIG. 10C.

Thus the processing in S214 and S216 is for counting only those times when the rough road discrimination parameter first becomes equal to or greater than the threshold value. In other words, these operations are for excluding cases in which the rough road discrimination parameter is equal to or greater than the threshold value in the preceding and earlier cycles and cases in which the rough road discrimination parameter is less than the current threshold value.

Next, in S220, it is determined whether the value of the counter NDIST is equal to or greater than a prescribed value #NDISTJD (e.g., 10 times). When the result is NO, the remaining step is skipped. When it is YES, the program proceeds to S222, in which the bit of the flag F.DIST is set to 1. The bit of this flag being set to 1 means that it is determined that a rough road running or other such specific running (operating) condition prevails.

The explanation of the misfire detection and so on will now be continued with reference to FIG. 2. When the result in S10 is YES, the program proceeds to S12, in which the rotation speed fluctuation of the crankshaft is measured. Specifically, the crank angle signal produced every 30 degrees is used to measure rotation time TREV(n) corresponding to a crank angle of 120 degrees and the deviation ΔTREV(n) relative to the rotation time TREV(n−1) in the preceding program cycle is calculated. The deviation ΔTREV(n−1) calculated in the preceding cycle, the deviation ΔTREV(n−2) calculated two cycles earlier (the cycle before last) and the deviation ΔTREV(n−3) calculated three cycles earlier are averaged and the difference between the average value and the calculated deviation ΔTREV(n) is calculated and defined as amount of rotation speed fluctuation ΔΔTREV(n).

The program then proceeds to S14, in which misfire discrimination is conducted. This involves first utilizing an appropriate method to determine a misfire detection value MFDEL by retrieval from a preset map (mapped data whose characteristics are not illustrated in the drawings) using the engine speed NE and the manifold absolute pressure PBA as address data, comparing the misfire detection value MFDEL with the amount of rotation speed fluctuation ΔΔTREV(n), setting a flag F.MF to 1 to indicate that misfire is detected when the amount of rotation speed fluctuation ΔΔTREV(n) exceeds the misfire detection value MFDEL and resetting the flag F.MF to 0 to indicate misfire does not occur when the amount of rotation speed fluctuation ΔΔTREV(n) is equal to or less than the misfire detection value MFDEL.

As mentioned earlier, the term "misfire" is used to encompass all cases in which combustion does not occur, irrespective of whether because of failure of the fuel supply system or failure of the ignition system, and also irrespective of whether or not spark discharge occurs.

Next, in S16, it is determined whether the bit of the flag F.MF is set to 1. When the result is YES, the program proceeds to S18, in which the cylinder discriminated to have misfired is determined based on the cylinder identification signal. In other words, occurrence of misfire in the engine 10 is discriminated in individual cylinders (i.e., cylinder by cylinder).

Next, in S20, the misfire number counter NMF associated with the cylinder concerned is selected from among counters provided in association with the individual cylinders and incremented by 1. The program then proceeds to S22, in which it is determined whether the number of TDCs for which misfire detection has been conducted in S12 and the ensuing steps has exceeded a prescribed value C (e.g., 3,000 times). When the result in S22 is NO, the remaining steps are skipped. When it is YES, the program proceeds to S24, in which abnormality discrimination is conducted. (It is worth noting that the prescribed value C can be set to some other value such as 600 times.)

The abnormality discrimination involves summing the values of the misfire number counters NMF provided at the individual cylinders to obtain the total number of misfires at the six cylinders and determining that the engine 10 is operating abnormally when the total exceeds a prescribed value. Alternatively, the engine 10 can be found to be operating abnormally when the value of the misfire number counter NMF associated with one of the cylinders exceeds another prescribed value.

Next, in S26, the values of the misfire number counters NMF are reset. When the result in S10 is NO, the remaining steps are skipped. When the result in S16 is NO, the program proceeds to S22.

Owing to the foregoing configuration of this embodiment, rough road running and other specific running (operating) conditions affecting misfire detection can be accurately detected to reliably avoid false misfire detection, without erroneously disabling misfire detection when misfire does occur.

By this, an eigenfrequency of the vehicle drive train can, for example, be selected as the prescribed frequency component to be extracted by the first filter, and a frequency at which the effect of misfire does not easily appear in the output signal of the wheel speed sensor 62 can, for example, be selected as the frequency that is higher than the prescribed frequency and not an integral multiple thereof to be extracted by the second filter. Extraction of solely the fluctuation of the wheel speed sensor output signal attributable to the rough road can therefore be discriminated, i.e., fluctuation of the wheel speed sensor output signal attributable to misfire can be eliminated.

Specifically, the eigenfrequency of the vehicle drive train, for example, is selected as the prescribed frequency component and this frequency component is extracted through the first filter, and a frequency that is higher than the prescribed frequency and not an integral multiple thereof, for example, a frequency component at which the effect of misfire does not easily appear in the output signal of the wheel speed sensor 62, is selected through the second filter. This makes it possible to extract only fluctuation produced in the output signal of the wheel speed sensor 62 by rough road running, i.e., makes it possible to eliminate fluctuation produced in the output signal of the wheel speed sensor 62 by misfire.

Owing to the fact that a frequency is selected that is higher than the prescribed frequency and not an integral multiple thereof, the effect of misfire does not appear simultaneously in both the output of the first filter and the output of the second filter and, therefore, fluctuation of the wheel speed sensor output signal attributable to misfire can be eliminated and solely the wheel speed sensor output signal attributable to rough road running can be extracted. As a consequence, rough road running or other such specific running (operating) condition can be accurately detected to reliably avoid false discrimination of misfire while ensuring that misfire detection is not erroneously disabled when misfire does occur.

Figure 11:
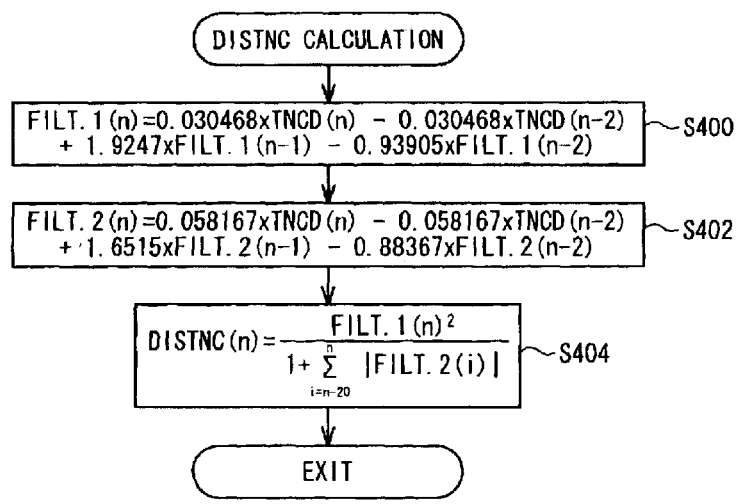
FIG. 11 is a flow chart, similar to FIG. 5, but showing the operation of a misfire detection system for a vehicle multicylinder internal combustion engine according to a second embodiment of the present invention.

FIG. 11 is a flow chart showing a process for calculating a rough road discrimination parameter similar to that of FIG. 5 in the operation of a misfire detection system for a vehicle multicylinder internal combustion engine according to a second embodiment of this invention.

Figure 12:
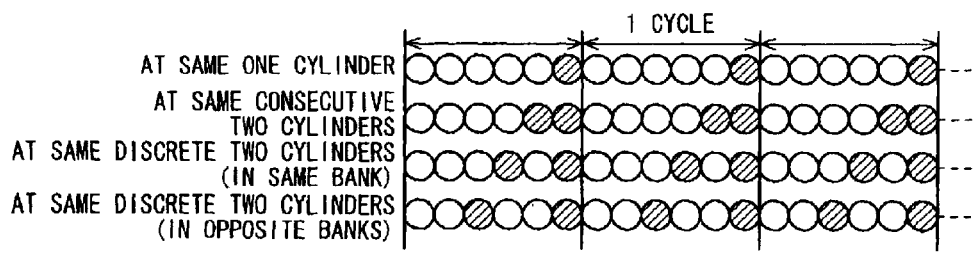
FIG. 12 is a view showing cyclic misfiring referred to in the system according to the second embodiment.

Before going into an explanation of the operation of the system of the second embodiment with reference to the drawings, an explanation will be made with reference to FIG. 12 regarding the problem the system in the second embodiment addresses.

When misfires occur in the same pattern during every cycle in the manner of consecutive misfires at the same cylinder or consecutive misfires at the same two cylinders, the rotation speed fluctuation caused by the misfires appears mainly as a component proportional to the engine speed. The term "misfires in the same pattern in every cycle" (hereinafter expressed as "cyclic misfiring") refers to misfires like those shown in FIG. 12. Specifically, it means that misfires repeatedly occur in the same pattern in consecutive cycles, where one cycle is defined as the combustions starting at the first cylinder and ending at the sixth cylinder of the engine 10 (as shown in the drawing).

When, for example, the engine 10 experiences such a cyclic misfiring at a single cylinder when operating at 1,200 rpm, the number of cycles per second is 10, so that the 10 Hz component becomes large.

When such a cyclic misfiring occurs, the engine speeds at which the rotation speed fluctuation produced by misfiring has 2 Hz and 13 Hz components are found by calculation to be 240 rpm and 1,560 rpm. The fact that the 2 Hz component corresponding to the eigenfrequency of the drive train becomes large at 240 rpm causes no problem in the first embodiment because 240 rpm is below #NMFL (idling speed; lower limit of engine speed for misfire detection) indicated in S100 of FIG. 3.

When the 13 Hz component occurs at 1,560 rpm, even if such a rotation speed fluctuation arises it does not excite a 2 Hz which is lower than itself so that rough road condition and misfire can still be distinguished with good accuracy using the rough road discrimination parameter DISTNC obtained as the product of the 2 Hz component and the 13 Hz component as explained regarding the first embodiment. Thus, not problem arises during the cyclic misfiring because the engine speed at which the 2 Hz component becomes pronounced is below the engine idling speed and sufficiently low.

In the case of misfire occurring randomly once every few cycles, however, the 2 Hz component is liable to become large in the normal engine speed range between engine idling speed and around 3,000 rpm. The term "misfire occurring randomly once every few cycles" (hereinafter expressed as "random misfiring") refers to misfires wherein misfire occurs at regular intervals and misfire occurs at a randomly cylinder during the cycle.

Figure 13:
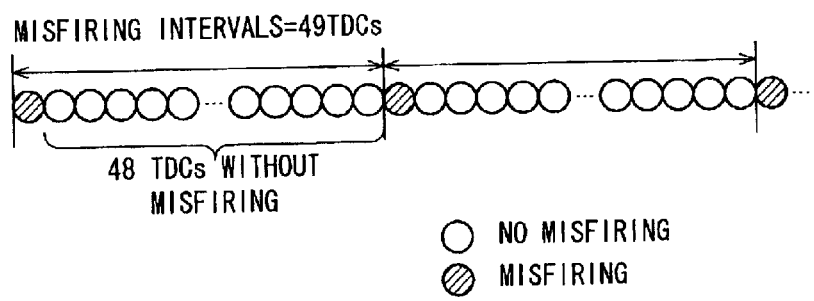
FIG. 13 is a view, similar to FIG. 12, but showing random misfiring referred to in the system according to the second embodiment.

Therefore, 2% random misfire, for instance, means one-off misfire occurring every $49^{th}$ TDC, as shown in FIG. 13 (actual misfire rate =1/49=2.04%). With respect to the illustrated six-cylinder engine 10, this means the misfire occurrence interval [Hz] Z can be generally expressed as Z=x/(20·y), where x is the engine speed [rpm] and y is the misfire interval [TDC number]. (Unlike in the cyclic misfiring, in random misfiring, the misfire interval is determined not only by the engine speed but also by once every how many TDCs misfire occurs.)

In the case of 2% random misfiring, i.e., when misfire occurs once every 49 TDCs, the misfire interval becomes 2 Hz when the engine 10 is operating at 1,960 rpm. If a 13 Hz component occurs to some extent, therefore, the rough road discrimination of the first embodiment is liable to mistake misfire occurrence for rough road running (without occurrence of misfire).

The system according to the second embodiment is therefore configured to enable accurate discrimination between misfire and rough road running (without misfire) even when such random misfiring occurs.

Against the foregoing backdrop, the rough road discrimination parameter calculation in the system of the second embodiment will now be explained with reference to the flow chart of FIG. 11.

First, in S400, the output of filter FILT.1(n) defined by the equation shown in the drawing is calculated. As in the first embodiment, the FILT.1 (first filter) is a band-pass filter that passes a prescribed frequency (eigenfrequency) in the output signal of the wheel speed sensor 62. This amounts to using the first filter FILT.1 to calculate a first fluctuation value of the wheel rotation speed TNCD (i.e., the output of the first filter FILT.1) based on the output signal of the wheel speed sensor 62.

Next, in S402, the output of filter FILT.2(n) defined by the equation shown in the drawing is calculated. The FILT.2 (second filter) is a band-pass filter that passes a frequency that is higher than the prescribed frequency and an integral multiple of the prescribed frequency. This amounts to using the second filter FILT.2 to calculate a second fluctuation value of the wheel rotation speed TNCD (i.e., the output of the second filter FILT.2) based on the output of the wheel speed sensor 62.

Next, in S404, a rough road discrimination parameter DISTNC is calculated based on the calculated outputs of the first filter FILT.1 and second filter FILT.2 in accordance with the equation shown in the drawing. The remainder of the processing is the same as that in the first embodiment.

The calculation of the rough road discrimination parameter in the system of the second embodiment will now be explained. As pointed out in the foregoing, the rough road discrimination of the first embodiment is liable to mistake misfire occurrence for rough road running (without misfire) if the 13 Hz component occurs to some extent when the engine 10 is operating at an engine speed at which the random misfiring misfire interval is 2 Hz.

On the other hand, focusing on the vehicle speed fluctuation frequency characteristic (obtained by Fourier transformation) when misfire occurs at 2 Hz intervals, it is found that, as shown in FIG. 9 relating to the first embodiment, harmonics that are integral multiples of the misfire interval (2 Hz corresponding to the eigenfrequency) occur during misfire occurrence, while as shown in FIG. 7, these harmonics do not arise during rough road running (without misfire). This means that presence/absence of rough road running (without misfire) and misfire occurrence can be distinguished from the relationship between the harmonic components and the 2 Hz component.

The second embodiment has been accomplished based on this finding. The 2 Hz component corresponding to eigenfrequency is extracted by the filter FILT.1 (first filter) as in the first embodiment, while the filter FILT.2 (second filter) does not extract a frequency at which the effect of misfire occurring at a period of 2 Hz does not easily appear in the fluctuation (e.g., a frequency such as 13 Hz that is not an integral multiple of the eigenfequency) but instead extracts a harmonic component that is an integral multiple of 2 Hz, such as 8 Hz.

Specifically, as shown at S404 of the flow chart of FIG. 11, the 2 Hz component is exaggerated by squaring the output of the filter FILT.1 and the rough road discrimination parameter DISTNC is calculated by dividing the squared value by the summed value of the 8 Hz component obtained from the output of the filter FILT.2 and appearing when misfire occurs at a period of 2 Hz (more precisely, the value obtained by summing the absolute value of the filter FILT.2 output a prescribed number of times (e.g., 20 times)). As a result, the rough road discrimination parameter is prevented from growing large when misfire actually occurs. In addition, 1 is added to the denominator so that when no misfire occurs and the 8 Hz component is therefore substantially nil, the quotient is prevented from approaching infinity because the denominator approaches 0.

Owing to the foregoing configuration of the second embodiment, the rough road discrimination parameter DISTNC can, on the one hand, be given a large value during rough road running (without misfire) and, on the other, be made substantially 0 when misfire occurs. As a result, misfire and rough road running can be accurately distinguished to prevent misfire occurrence from being misidentified as rough road running (without misfire) and thereby reliably avoid false misfire detection.

Although in the second embodiment the filter FILT.2 extracts an 8 Hz component as the harmonic component that is an integral multiple of 2 Hz (the eigenfrequency), the invention is not limited to this and the extracted can be any integral multiple of the of the eigenfrequency of the vehicle drive train.

Figure 14:
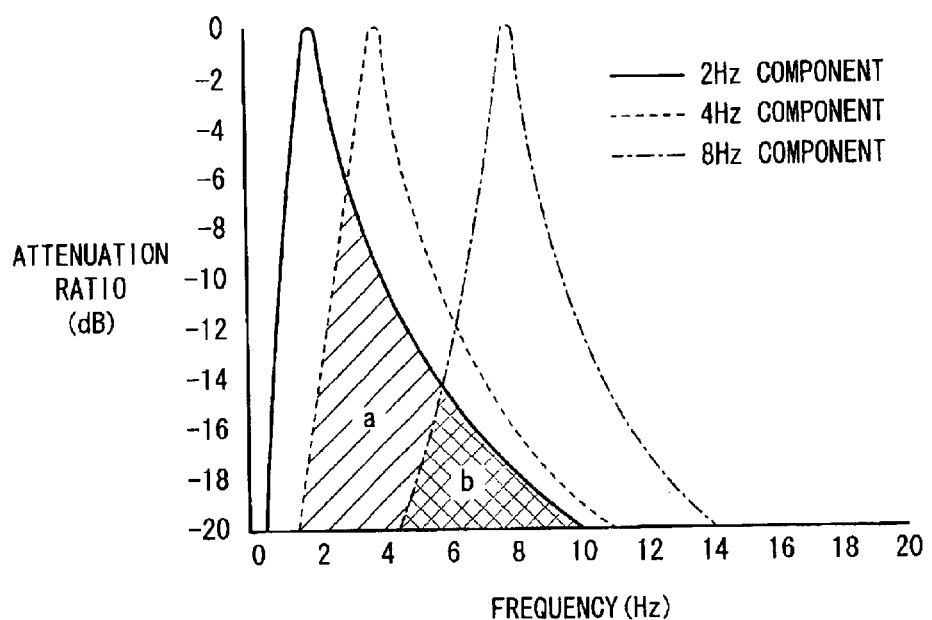
FIG. 14 is a graph showing a range of frequency components to be passed through the second filter referred to in the flow chart of FIG. 11.

As shown in FIG. 14, in the case of a second-order component (4 Hz), the accuracy of the discrimination between rough road running and misfire is lowered by the fact that the region marked a is hard to separate from the 2 Hz component (corresponding to the eigenfrequency) at the time of extraction by the filter. The region marked b is a fourth-order (8 Hz) component, which does not cause a problem because the region that is difficult to separate is smaller than that in the case of the second-order component. Moreover, the accuracy of the discrimination between misfire and rough road running also diminishes in the case of the sixth- and higher-order (12 Hz and higher) components because, as shown in FIG. 9, the amplitude of the harmonics produced during misfire attenuates.

In view of the foregoing, around a third- to fifth-order (6 Hz to 10 Hz) component is preferably extracted as the harmonic component, i.e., the integral multiple of the eigenfrequency, to be extracted by the filter FILT.2. Although it has been stated that the output of the filter FILT.2 is summed 20 times, the invention is not limited to this number of times.

As stated above, the first and second embodiments are configured to have a system for detecting misfire occurred in an internal combustion engine (10) having a plurality of cylinders (20) and installed in a vehicle, comprising: an engine speed sensor (camshaft sensor 36) that outputs a signal at every prescribed crank angle (at every 30-degree subdivisions between the TDC signals) indicative of a speed of the engine (NE); misfire detection means (ECU 70, S12, S14) for detecting misfire occurred in individual cylinders of the engine based on the rotation signal outputted by the engine speed sensor; a wheel speed sensor (62) that outputs a signal indicating a rotation speed of a wheel of the vehicle TNCD; first fluctuation value calculation means (ECU 70, S206, S300, S400) for calculating a first fluctuation value (FILT.1) of the wheel rotation speed based on the signal outputted by the wheel speed sensor through a first filter; second fluctuation value calculation means (ECU 70, S206, S302, S402) for calculating a second fluctuation value (FILT.2) of the wheel rotation speed based on the signal outputted by the wheel speed sensor through a second filter; specific running condition discrimination means (ECU 70, S206, S304, S404, S200-S222) for calculating a parameter (rough road discrimination parameter DISTNC) indicative of a degree of fluctuation of the wheel rotation speed based on the calculated first fluctuation value and second fluctuation value, and for discriminating whether the vehicle is under a specific running condition that affects the misfire detection of the misfire detection means based on the calculated parameter; and misfire detection disable means (ECU 70, S114, S118, S10) for disabling the misfire detection of the misfire detection means when the specific running condition discrimination means discriminates that the vehicle is under the specific running condition.

In the system, first filter is a band-pass filter that passes a first prescribed frequency component (i.e., eigenfrequency inherent to the drive train of the vehicle, e.g., 2 Hz) in the output signal of the wheel speed sensor, and the second filter is a band-pass filter that passes a second frequency component (specifically, 10 to 15 Hz, e.g., 13 Hz) that is higher than the first prescribed frequency and that is not a multiple (in integer) of the first prescribed frequency.

In the system, the specific running condition discrimination means calculates the parameter by multiplying the calculated first fluctuation value (FILT.1) and second fluctuation value (FILT.2) together.

In the system, the first filter is a band-pass filter that passes a first prescribed frequency component (i.e., eigenfrequency inherent to the drive train of the vehicle, e.g., 2 Hz) in the output signal of the wheel speed sensor, and the second filter is a band-pass filter that passes a second frequency component that is higher than the first prescribed frequency and that is a multiple (in integer) of the first prescribed frequency (specifically, a third to fifth-order harmonics component).

In the system, the specific running condition discrimination means calculates the parameter by dividing the calculated first fluctuation value by the second fluctuation value. More specifically, the 2 Hz component is exaggerated by squaring the output of the filter FILT.1 and the rough road discrimination parameter DISTNC is calculated by dividing the squared value by the summed value of the 8 Hz component obtained from the output of the filter FILT.2 and appearing when misfire occurs at a period of 2 Hz (more precisely, the value obtained by summing the absolute value of the filter FILT.2 output a prescribed number of times (e.g., 20 times)). In addition, 1 is added to the denominator.

In the system, the specific running condition discrimination means discriminates that the vehicle is under the specific running condition when the calculated parameter is determined to be equal to or greater than a threshold value (DISTNCJD).

In the system, threshold value is determined based on a speed of the vehicle (V) and the load of the engine (manifold absolute pressure PBA). More specifically, the threshold value is determined based on the vehicle speed (V), the engine load (manifold absolute pressure PBA) and a gear of a manual transmission (60) connected to the engine in the vehicle.

The entire disclosure of Japanese Patent Application Nos. 2002-054267 filed on Feb. 28, 2002 and 2002-179712 filed on Jun. 20, 2002, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting misfire occurred in an internal combustion engine having a plurality of cylinders and installed in a vehicle, comprising:

an engine speed sensor that outputs a signal at every prescribed crank angle indicative of a speed of the engine;

misfire detection means for detecting misfire occurred in individual cylinders of the engine based on the signal outputted by the engine speed sensor;

a wheel speed sensor that outputs a signal indicating a rotation speed of a wheel of the vehicle;

first fluctuation value calculation means for calculating a first fluctuation value of the wheel rotation speed based on the signal outputted by the wheel speed sensor through a first filter;

second fluctuation value calculation means for calculating a second fluctuation value of the wheel rotation speed based on the signal outputted by the wheel speed sensor through a second filter;

specific running condition discrimination means for calculating a parameter indicative of a degree of fluctuation of the wheel rotation speed based on the calculated first fluctuation value and second fluctuation value, and for discriminating whether the vehicle is under a specific running condition that affects the misfire detection of the misfire detection means based on the calculated parameter; and misfire detection disable means for disabling the misfire detection of the misfire detection means when the specific running condition discrimination means discriminates that the vehicle is under the specific running condition.

2. A system according to claim 1, wherein the first filter is a band-pass filter that passes a first prescribed frequency component in the output signal of the wheel speed sensor, and the second filter is a band-pass filter that passes a second frequency component that is higher than the first prescribed frequency and that is not a multiple of the first prescribed frequency.

3. A system according to claim 2, wherein the specific running condition discrimination means calculates the parameter by multiplying the calculated first fluctuation value and second fluctuation value together.

4. A system according to claim 3, wherein the specific running condition discrimination means discriminates that the vehicle is under the specific running condition when the calculated parameter is determined to be equal to or greater than a threshold value.

5. A system according to claim 4, wherein the threshold value is determined based on a speed of the vehicle and the load of the engine.

6. A system according to claim 5, wherein the threshold value is determined based on the vehicle speed, the engine load and a gear of a transmission connected to the engine in the vehicle.

7. A system according to claim 1, wherein the first filter is a band-pass filter that passes a first prescribed frequency component in the output signal of the wheel speed sensor, and the second filter is a band-pass filter that passes a second frequency component that is higher than the first prescribed frequency and that is a multiple of the first prescribed frequency.

8. A system according to claim 7, wherein the specific running condition discrimination means calculates the parameter by dividing the calculated first fluctuation value by the second fluctuation value.

9. A system according to claim 8, wherein the specific running condition discrimination means discriminates that the vehicle is under the specific running condition when the calculated parameter is determined to be equal to or greater than a threshold value.

10. A system according to claim 9, wherein the threshold value is determined based on at least a speed of the vehicle and the load of the engine.

11. A system according to claim 10, wherein the threshold value is determined based on the vehicle speed, the engine load and a gear of a transmission connected to the engine in the vehicle.

12. A system for detecting misfire occurred in an internal combustion engine having a plurality of cylinders and installed in a vehicle, comprising:

an engine speed sensor that outputs a signal at every prescribed crank angle indicative of a speed of the engine;

misfire detection unit that detects misfire occurred in individual cylinders of the engine based on the signal outputted by the engine speed sensor;

a wheel speed sensor that outputs a signal indicating a rotation speed of a wheel of the vehicle;

first fluctuation value calculation unit that calculates a first fluctuation value of the wheel rotation speed based on the signal outputted by the wheel speed sensor through a first filter;

second fluctuation value calculation unit that calculates a second fluctuation value of the wheel rotation speed based on the signal outputted by the wheel speed sensor through a second filter;

specific running condition discrimination unit that calculates a parameter indicative of a degree of fluctuation of the wheel rotation speed based on the calculated first fluctuation value and second fluctuation value, and discriminates whether the vehicle is under a specific running condition that affects the misfire detection of the misfire detection unit based on the calculated parameter; and misfire detection disable unit that disables the misfire detection of the misfire detection means when the specific running condition discrimination unit discriminates that the vehicle is under the specific running condition.

13. A system according to claim 12, wherein the first filter is a band-pass filter that passes a first prescribed frequency component in the output signal of the wheel speed sensor, and the second filter is a band-pass filter that passes a second frequency component that is higher than the first prescribed frequency and that is not a multiple of the first prescribed frequency.

14. A system according to claim 13, wherein the specific running condition discrimination unit calculates the parameter by multiplying the calculated first fluctuation value and second fluctuation value together.

15. A system according to claim 14, wherein the specific running condition discrimination unit discriminates that the vehicle is under the specific running condition when the calculated parameter is determined to be equal to or greater than a threshold value.

16. A system according to claim 15, wherein the threshold value is determined based on at least a speed of the vehicle and the load of the engine.

17. A system according to claim 16, wherein the threshold value is determined based on the vehicle speed, the engine load and a gear of a transmission connected to the engine in the vehicle.

18. A system according to claim 12, wherein the first filter is a band-pass filter that passes a first prescribed frequency component in the output signal of the wheel speed sensor, and the second filter is a band-pass filter that passes a second frequency component that is higher than the first prescribed frequency and that is a multiple of the first prescribed frequency.

19. A system according to claim 18, wherein the specific running condition discrimination unit calculates the parameter by dividing the calculated first fluctuation value by the second fluctuation value.

20. A system according to claim 19, wherein the specific running condition discrimination unit discriminates that the vehicle is under the specific running condition when the calculated parameter is determined to be equal to or greater than a threshold value.

21. A system according to claim 20, wherein the threshold value is determined based on a speed of the vehicle and the load of the engine.

22. A system according to claim 21, wherein the threshold value is determined based on the vehicle speed, the engine load and a gear of a transmission connected to the engine in the vehicle.

23. A method of detecting misfire occurred in an internal combustion engine having a plurality of cylinders and installed in a vehicle, comprising the steps of:

detecting misfire occurred in individual cylinders of the engine based on a signal, outputted by an engine speed sensor at every prescribed crank angle, indicative of a speed of the engine;

calculating a first fluctuation value of the wheel rotation speed based on a signal, outputted by a wheel speed sensor, indicating a rotation speed of a wheel of the vehicle;

calculating a second fluctuation value of the wheel rotation speed based on the signal outputted by the wheel speed sensor through a second filter;

calculating a parameter indicative of a degree of fluctuation of the wheel rotation speed based on the calculated first fluctuation value and second fluctuation value;

discriminating whether the vehicle is under a specific running condition that affects the misfire detection based on the calculated parameter; and disabling the misfire detection when it is discriminated that the vehicle is under the specific running condition.

24. A method according to claim 23, wherein the first filter is a band-pass filter that passes a first prescribed frequency component in the output signal of the wheel speed sensor, and the second filter is a band-pass filter that passes a second frequency component that is higher than the first prescribed frequency and that is not a multiple of the first prescribed frequency.

25. A method according to claim 24, wherein the step of specific running condition discrimination calculates the parameter by multiplying the calculated first fluctuation value and second fluctuation value together.

26. A method according to claim 25, wherein the step of specific running condition discrimination discriminates that the vehicle is under the specific running condition when the calculated parameter is determined to be equal to or greater than a threshold value.

27. A method according to claim 26, wherein the threshold value is determined based on a speed of the vehicle and the load of the engine.

28. A method according to claim 27, wherein the threshold value is determined based on the vehicle speed, the engine load and a gear of a transmission connected to the engine in the vehicle.

29. A method according to claim 23, wherein the first filter is a band-pass filter that passes a first prescribed frequency component in the output signal of the wheel speed sensor, and the second filter is a band-pass filter that passes a second frequency component that is higher than the first prescribed frequency and that is a multiple of the first prescribed frequency.

30. A method according to claim 29, wherein the step of specific running condition discrimination calculates the parameter by dividing the calculated first fluctuation value by the second fluctuation value.

31. A method according to claim 30, wherein the step of specific running condition discrimination discriminates that the vehicle is under the specific running condition when the calculated parameter is determined to be equal to or greater than a threshold value.

32. A method according to claim 31, wherein the threshold value is determined based on at least a speed of the vehicle and the load of the engine.

33. A method according to claim 32, wherein the threshold value is determined based on the vehicle speed, the engine load and a gear of a transmission connected to the engine in the vehicle.

34. A computer program embodied on a computer-readable medium for detecting misfire occurred in an internal combustion engine having a plurality of cylinders and installed in a vehicle, comprising the steps of:

detecting misfire occurred in individual cylinders of the engine based on a signal, outputted by an engine speed sensor at every prescribed crank angle, indicative of a speed of the engine;

calculating a first fluctuation value of the wheel rotation speed based on a signal, outputted by a wheel speed sensor, indicating a rotation speed of a wheel of the vehicle;

calculating a second fluctuation value of the wheel rotation speed based on the signal outputted by the wheel speed sensor through a second filter;

calculating a parameter indicative of a degree of fluctuation of the wheel rotation speed based on the calculated first fluctuation value and second fluctuation value;

discriminating whether the vehicle is under a specific running condition that affects the misfire detection based on the calculated parameter; and disabling the misfire detection when it is discriminated that the vehicle is under the specific running condition.

* * * * *